United States Patent [19]
Brash et al.

[11] Patent Number: 5,926,128
[45] Date of Patent: Jul. 20, 1999

[54] RADAR SYSTEMS

[75] Inventors: Robert Alan David Brash, St. Albans; William Bowring Stawell, Beaconsfield, both of United Kingdom

[73] Assignee: The Marconi Company Limited, Chelmsford, United Kingdom

[21] Appl. No.: 05/413,190

[22] Filed: Nov. 1, 1973

[30] Foreign Application Priority Data

Nov. 1, 1972 [GB] United Kingdom ............... 50447/72

[51] Int. Cl.[6] ........................................... G01S 13/00
[52] U.S. Cl. ................................... 342/149; 342/74
[58] Field of Search .................. 343/7.4, 16 M; 342/149, 74

[56] References Cited

U.S. PATENT DOCUMENTS

| | | | |
|---|---|---|---|
| 3,343,166 | 9/1967 | Poinsard | 343/16 M |
| 3,406,393 | 10/1968 | Kulik | 343/7.4 |
| 3,467,963 | 9/1969 | Van Popta | 343/7.4 |
| 3,550,126 | 12/1970 | Van Hijfte et al. | 343/7.4 |
| 3,634,860 | 1/1972 | Rittenbach | 343/9 |
| 3,680,102 | 7/1972 | Poinsard | 343/16 M |
| 3,728,723 | 4/1973 | Gellekink | 343/7.4 |

FOREIGN PATENT DOCUMENTS

| | | |
|---|---|---|
| 902432 | 10/1957 | United Kingdom . |
| 840118 | 7/1960 | United Kingdom . |
| 870873 | 6/1961 | United Kingdom . |
| 1 214 305 | 12/1970 | United Kingdom . |
| 1 260 446 | 1/1972 | United Kingdom . |
| 1605419 | 11/1997 | United Kingdom . |

*Primary Examiner*—Theodore M. Blum
*Attorney, Agent, or Firm*—Kirschstein et al.

[57] ABSTRACT

A target tracking radar system for a guided missile wherein sum and difference signals from a reception antenna are multiplexed at a variable rate into a single channel receiver, the multiplexing rate depending on an alternating reference signal. The output of the receiver is applied to a phase sensitive detector operating in synchronism with the alternating reference signal and whose output is utilised to guide the missile towards the target. The detector output is also integrated and applied to circuit means which produces the reference signal, thereby forming a closed loop. The integrated detector output is also applied to a servo motor which drives the antenna to track the target.

4 Claims, 5 Drawing Sheets

RADAR SYSTEMS

This invention relates to radar systems.

It has been proposed to use, in a radar system, an antenna comprising a dish with two symmetrically placed off-axis feeds. Such an antenna has an antenna reception pattern comprising two overlapping main lobes which are inclined at equal but opposite angles to the dish axis; the two lobes being associated respectively with the two feeds. In operation, radio waves reflected from a target are picked up by both feeds to give two output signals. If the target lies on the dish axis, these signals are of equal amplitude and are in-phase. Otherwise, however, they differ in both amplitude and phases depending on the angle between the target and the dish axis (referred to as the error angle). Therefore, by suitably processing the two antenna outputs, fit is possible to derive an error signal which is a measure of the error angle.

This signal may, for example, be used to control servo motors which steer the dish, so as to tend to reduce the error angle to zero, and thus cause the dish to track the target.

One known way of processing the antenna outputs is to feed both outputs to a hybrid circuit which produces signals respectively equal to the sum and difference of the antenna outputs. These (RF) sum and difference signals are fed to separate receiver channels, to give respective IF outputs. The output level of the sum channel is controlled by an a.g.c. system to a constant level, independent of target range and magnitude. The same a.g.c. signal controls the gain of the difference channels. The IF signal from the difference channel is fed to a phase-sensitive detector, which uses the signal from the sum channel as a reference signal, to produce a D.C. error signal the magnitude of which depends on the amplitude of the difference signal, and the sign of which depends en the relative phases of the sum and difference signals. The amplitude of the error signal is thus a measure of the magnitude of the error angle, while the sign of the error signal denotes the direction of the error angle.

In such a system, the two receiver channels must be matched very accurately, as regards both gain and phase, over the whole range of their operating conditions. This requires a complex and expensive receiver system.

One object of the present invention is to obviate the necessity for accurately matched receiver channels in a system of this nature.

According to the invention, a radar system comprises: an antenna arrangement having at least two outputs corresponding respectively to two over-lapping main lobes in the antenna reception pattern, a multiplexer for feeding signals, produced at the respective antenna outputs when radio waves from a target are received by the antenna, alternately to a single receiver channel in synchronism with an alternating reference signal; and an error circuit responsive to the output of the receiver channel and to the reference signal to produce an error signal the magnitude and sign of which are respectively representative of the magnitude and direction of an error angle between the target and a predetermined axis which is fixed relative to said reception pattern.

This error signal may be used to control one or more servo motors which steer the antenna, thus causing the antenna to track the target.

Said antenna arrangement may, for example, comprise a single dish with two offset feeds, or may comprise two or more dishes, each with its own feed.

Conveniently, said multiplexer comprises: a first hybrid circuit responsive to the antenna output signals to produce signals proportional to the sum and difference of the antenna output signals; a phase switch for alternately applying phase shifts of 180° C. and zero to the difference signal in synchronism with said reference signal; and a second hybrid circuit responsive to the sum signal and the phase-shifted difference signal to produce an output signal proportional to the sum thereof. It will be seen that the output of the second hybrid circuit thus alternately has values proportional to the two antenna outputs.

In one form of the invention, the error circuit may conveniently comprise a phase-sensitive detector arranged to produce an output signal the magnitude of which depends on the modulation of the output from the receiver channel (and hence on the difference between the antenna output signals) and the sign of which depends on the relative phases of the output from the receiver channel and said reference signal.

In a preferred form of the invention, Lowever, the system includes means for controlling the mark/space ratio of the reference signal (and hence the ratio of the relative periods spent by the multiplexer in feeding the two antenna outputs respectively to the receiver) and the error circuit comprises: a phase-sensitive detector arranged to produce an output signal the magnitude of which depends on the modulation of the output from the receiver channel weighted by the mark/space ratio of the receiver output, and she sign of which depends on the relative phases of the receiver output and said reference signal; and an integrator for forming a time integral of the detector output signal over a period substantially longer than the period of the reference signal, the value of said time integral being& used to provide an error signal for controlling said mark/space ratio in such a manner as to tend to reduce the detector output signal to zero. As will be seen, the error signal thus tends to a value which is a measure of the magnitude of the error angle. The detector output signal therefore represents the rate of change of that angle with time.

An advantage of this preferred form of the invention is that, because it is a closed-loop system, variations in the tome constant and the gain of the receiver channel do not affect the accuracy of the measurement of the error angle. The accuracy is determined solely by the accuracy of the integrator and of the means for controlling the mark/space ratio of the reference signal, and the accuracy of antenna lobe spacing.

Another advantage is that it provides a measure of the rate of change of the error angle, which is useful in certain applications.

In one particular embodiment of this preferred form of the invention, said error signal is formed by subtracting a correction signal representative of the angle between the antenna axis and a predetermined reference direction from the integrator output. The effect of this is to wake the integrator output a measure of the angle between the target and the reference direction, and thus to make the detector output signal a measure of the rate of change of that angle with time. This correction signal may be derived from a sensing device which measures the angle between the antenna axis and some structure (e.g. an aircraft or missile) on which the antenna is mounted, and/or may be derived from a gyro which measures the orientation of that structure with respect to the reference direction in spaces The radar system may be of the "active" kind, comprising means for transmitting radio waves for reflection from a target. In this case, the same antenna arrangement is conveniently used both for transmitting and for receiving. Alternatively, the system may be of the "semi-active" kind, relying on radio waves transmitted from some other source.

The system may be designed for use either in a continuous wave manner, or in a pulsed manner. Where pulsed radio waves are used, the receiver channel will usually include a boxcar circuit for stretching each pulse to a length approximately equal to the pulse repetition period, as is conventional with pulsed radar systems. In such a case preferably there is provided gating means for preventing the multiplexer from switching from one antenna output to the other during the course of a stretched pulse. This precaution ensures that quantisation errors, due to the fact that the incoming radio waves are pulsed, do not significantly affect the accuracy of the system, even when the pulse repetition frequency of the radio wave is not an integral multiple of the frequency of said reference signal.

It will be appreciated that the invention extends to radar systems comprising antenna arrangements having more than two outputs, and arranged to produce two or more error signals representative of error angles in different planes, (e.g. azimuth and elevation). In such a system, a separate receiver channel may be provided for each error angle, or alternatively the outputs from the antenna may all be multiplexed into a single receiver channel.

One radar system in accordance with the invention for use in a missile guidance system will now be described, by way of example, with reference to the accompanying drawings, of which:

FIG. 12 is a schematic elan view of the missile, showing the relationships between certain angles referred to.

Figure 1:
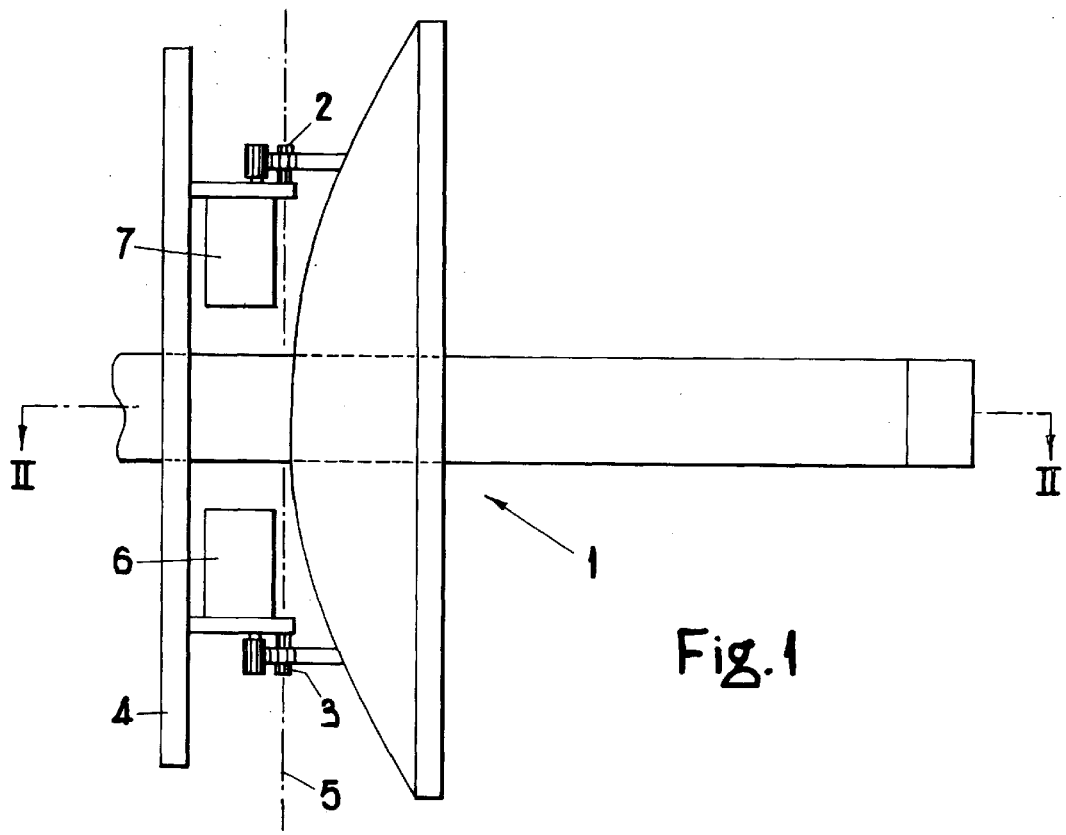
FIG. 1 is a schematic elevation of the antenna of the radar system.
Figure 2:
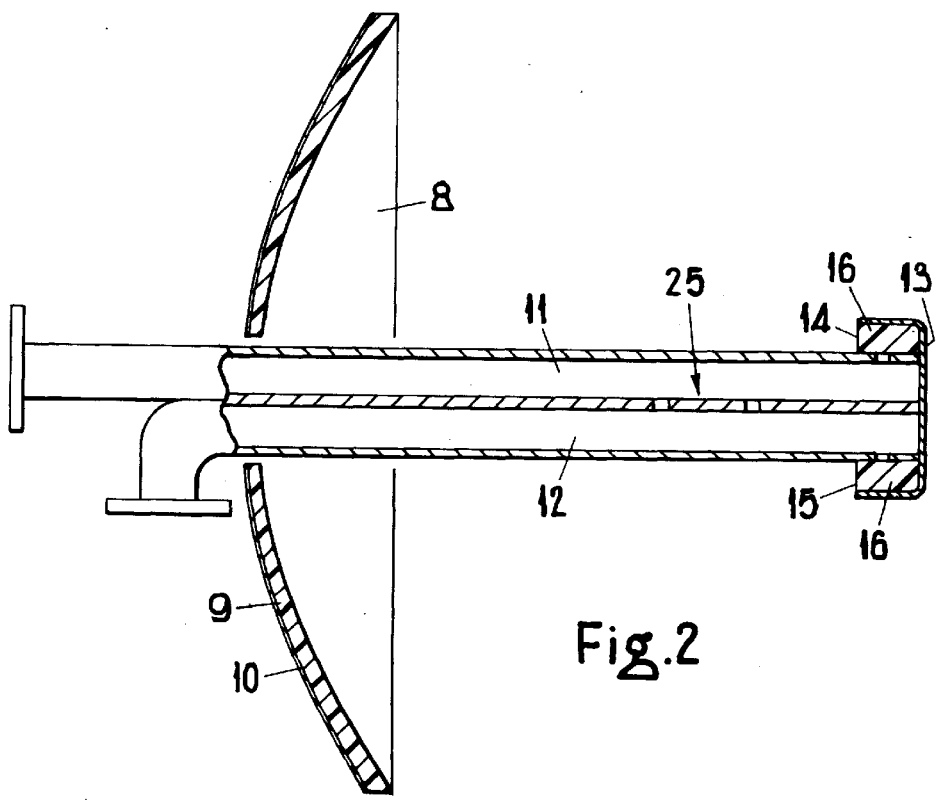
FIG. 2 is a schematic sectional plan view of the antenna of FIG. 1, along the line II—II.

Referring to FIG. 1, the radar system comprises an antenna arrangement 11 housed within a radome (not shown) in the nose of the missiles Referring to FIG. 2, the antenna 1 comprises a reflector dish 8, comprising a concavo-convex poly-carbonate lens 9 the convex-spherical back surface of which carries a layer 10 of metal. The antenna has two feed wave-guides 11 and 12 terminating in a feed cap 13 having two ports 14 and 15 which are loaded with dielectric material 16. The two ports 14 and 15 act as feed horns for the dish. The antenna is designed to operate in the X-band (e.g. at 9250 to 9550 megahertz) with radio waves polarised in the plane of the drawing of FIG. 2.

Referring again to FIG. 1, the dish 8 is mounted on pivots 2 end 3 on a plate 4 which is in turn fixed to the body of the missile. In normal operation, when the missile is travelling in a level flight path, the axis 5 of the pivots 2 and 3 is maintained vertical, allowing the dish 8 to be tilted through an azimuthal angle, by means of an electric servo motor 6, the resulting angle of tilt being measured by a pick-off potentiometer 7.

The feed waveguides 11 and 12 do not tilt, however, being fixed with respect to the body of the missile. The lens 9 is shaped to provide a phase correction to take account of the relative movement between the dish and the feeds when the dish is tilted.

Figure 3:
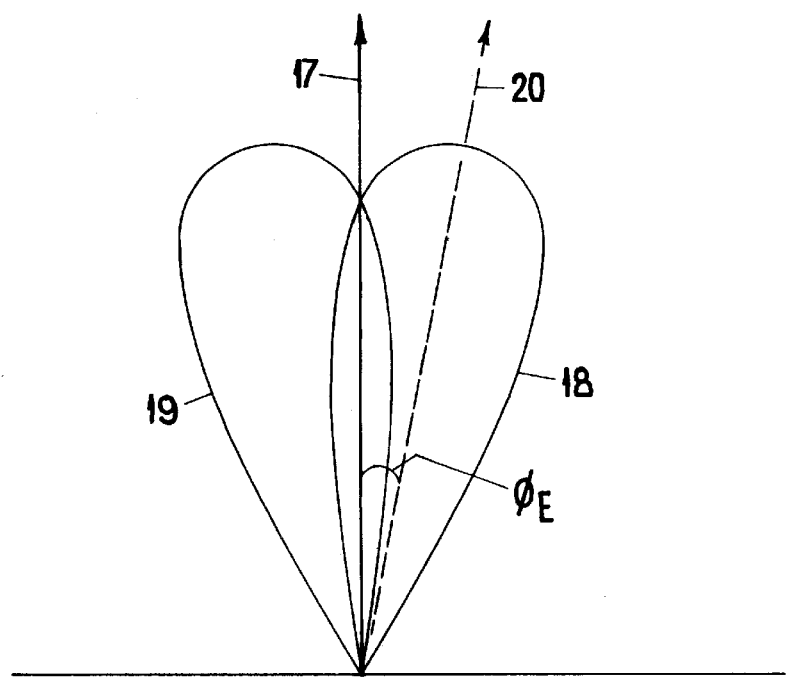
FIG. 3 is a polar diagram showing the antenna reception pattern.

Referring to FIG. 3, the antenna reception pattern which results from this arrangement has two similar main lobes 18 and 19, inclined at equal but opposite angles to an axis 17 (hereinafter referred to as the antenna axis, although it will be appreciated that this axis does net necessarily coincide with the axis of symmetry of the dish 8) in the horizontal plane. These lobes correspond respectively to the feed waveguides 11 and 12. It will be seen that when a radio wave is received by the dish from a target, along some line of sight 20 say, output signals will be produced in both feed waveguides 11 and 12. These output signals will, in general, differ in both amplitude and phase, unless the target lies on the antenna axis 17.

Figure 4:
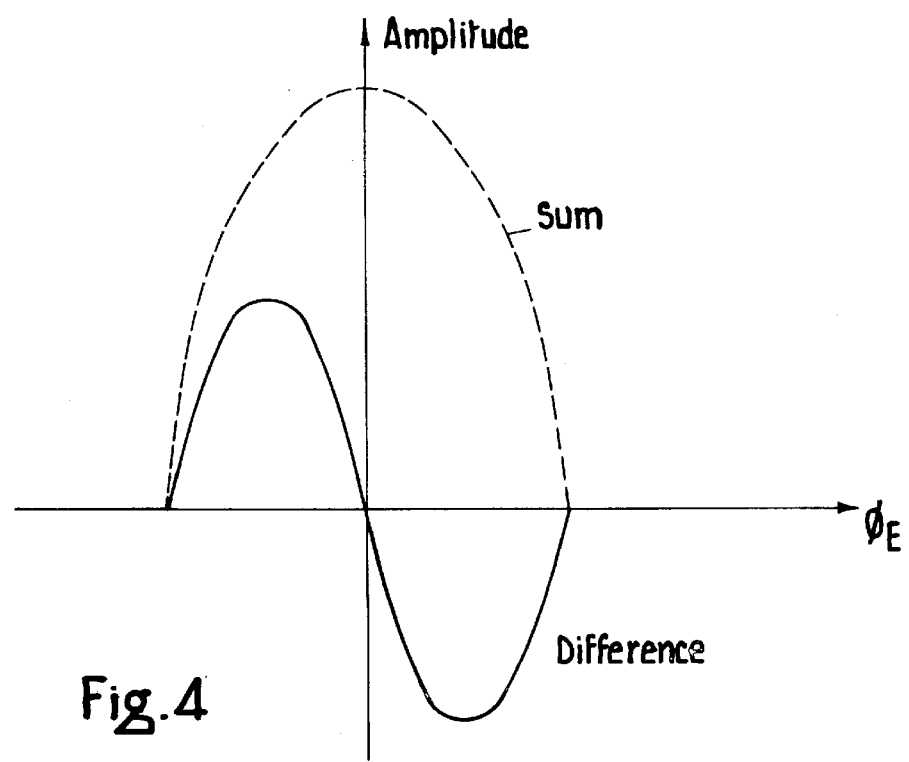
FIG. 4 is a graph illustrating the outputs of the antenna.

FIG. 4 shows the values of the sum and difference of these two output signals as functions of the azimuthal error angle $\phi_E$ between the antenna axis 17 and the target line of sight 20. It will be seen that the amplitude of the difference signal (for small angles) is proportional to the magnitude of the angle $\phi_E$, while the relative phase of the sum and difference signals gives an indication of the direction (i.e. sense) of the angle $\phi_E$.

Figure 5:
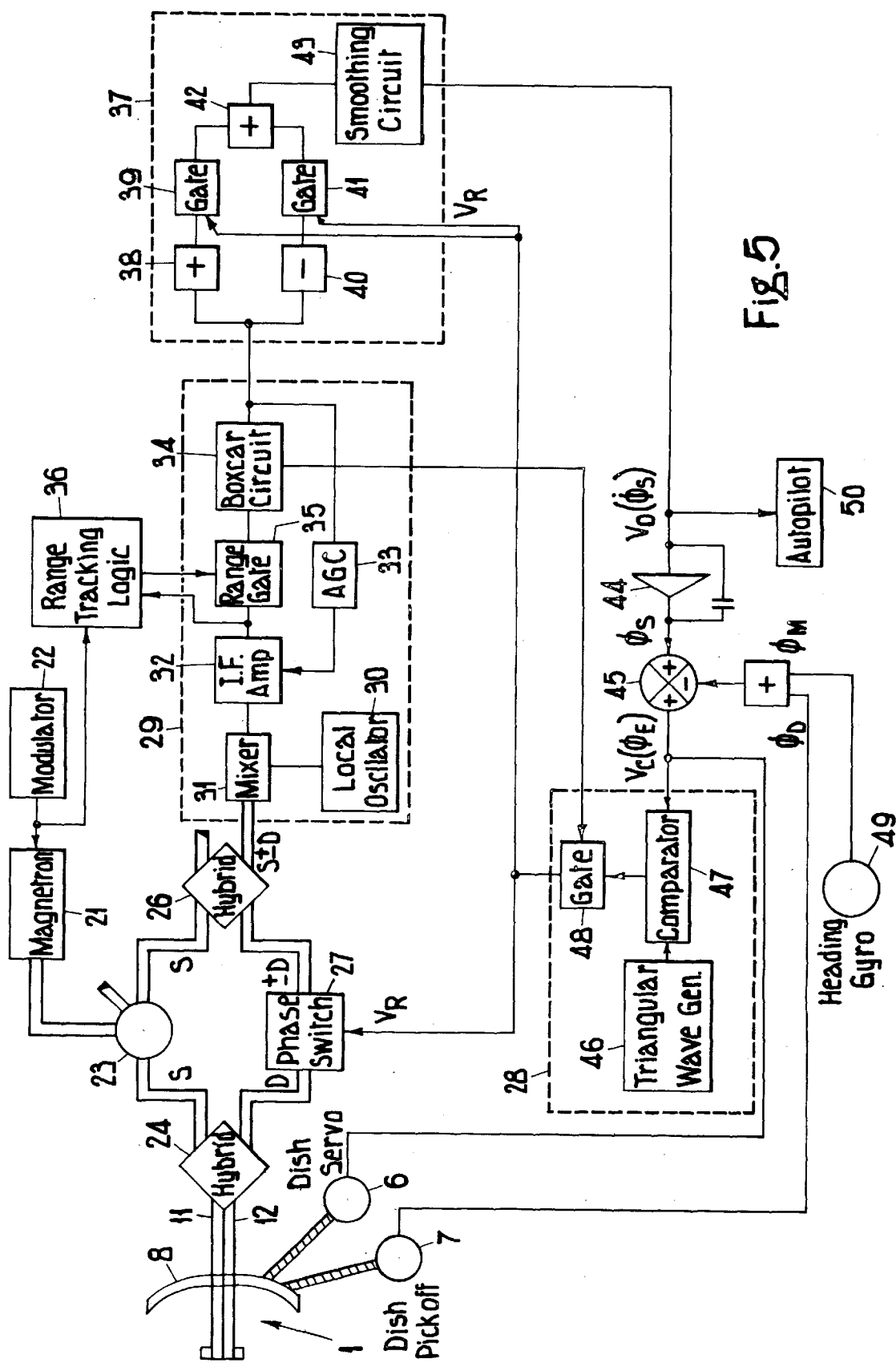
FIG. 5 is a schematic block circuit diagram of the radar system.

Referring now to FIG. 5, the radar system is an active one, that is to say, radiates its own beam of radio waves to produce reflections from a target. A pulsed RF signal is generated by a magnetron 21, modulated by a pulse-modulating circuit 22, the pulse repetition frequency typically being of the order of 3000 hertz. This signal is applied by way of a duplexor 23 to a hybrid circuit 24, splitting it into two equal signals which are respectively fed to the two feed waveguides 11 and 12. As a result, the antenna 1 radiates a beam of radio waves which is symmetrical about the vertical plane through the axis 17.

(In the particular embodiment described, the hybrid circuit 24 is conveniently constituted by a simple broad-wall coupler 25 between the feed waveguides 11 and 12 as shown in FIG. 2, although in other embodiments this hybrid may, of course, be a separate component.)

Some of the transmitted radio waves may be reflected from a target, and some of these reflected waves are picked up by the antenna 1, producing the signals in the waveguides 11 and 12, representing the reception from the two lobes 18 and 19 respectively. The signals in the waveguides 11 and 12 are mixed in the hybrid 24, to give a sum signal (S) and a difference signal (D) proportional to the sum and the difference of the signals from the two lobes.

The sum signal (S) is fed via the duplexor 23, which acts to isolate the receiver from the transmitted pulses, to a second hybrid circuit 26.

Figure 6:
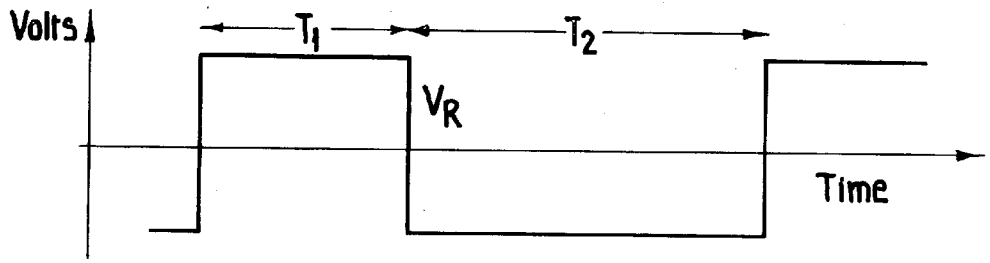
FIGS. 6–11 are graphs showing the waveforms of certain voltages in the system.

The difference signal (D) is fed to a phase switch 27, Which alternately shifts the phase of the difference signal by 180° and zero, in synchronism with a square wave reference signal $V_R$ from a reference generator circuit 25. A portion of this reference signal is shown in FIG. 6, the "mark" length of the signal being designated $T_1$ and the "space" length being designated $T_2$. As will be described, the reference generator circuit 28 can be controlled so as to vary the mark/space ratio $T_1/T_2$ of the reference signal. The phase-shifted difference signal (±D) is mixed with the sum signal in the hybrid circuit 26, to give an output (S±D) consisting of the sum signal modulated by the difference signal, at the frequency of the reference signal. This output is fed to a receiver 29.

Figure 7:
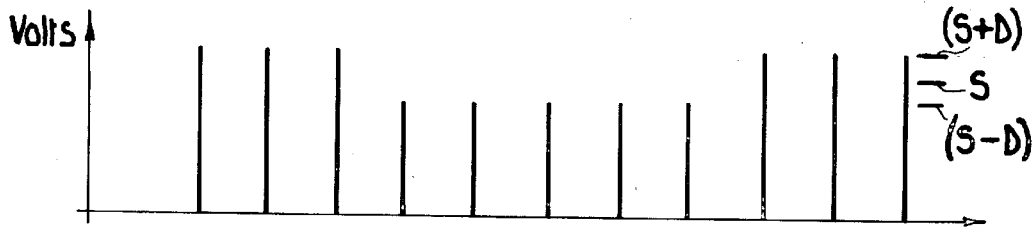

By way of illustration, FIG. 7 shows the signal (s±D) for the particular case where the pulse repetition frequency of the radio wave (as determined by the modulator 22) is eight times the frequency of the reference signal, and the mark/space ratio is 3:5.

Viewed another way, the output of the hybrid 26 alternates between values proportional to the signals from the two lobes 18 and 190 Thus, the combination of the two hybrids 24 and 26 and the phase switch 27 acts as a multiplexer, effectively feeding the signals from the two lobes 18 and 19 alternately to the receiver 29, for periods $T_1$ and $T_2$ respectively.

Figure 8:
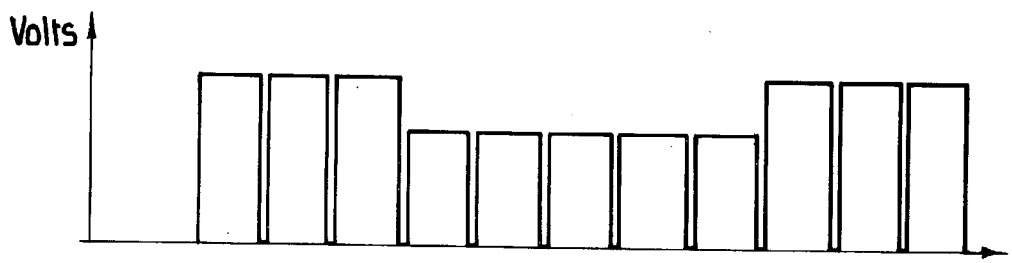

The receiver 29 comprises a local oscillator 30 and mixer 31, and an IF amplifier 32, the gain of which is controlled by an automatic gain control circuit 33. The receiver also includes a boxcar circuit 34, which acts to stretch the pulses so as effectively to close the gaps between them. The result of this stretching is the video signal shown in FIG. 8. A range gate 35 is also included in the receiver, being controlled by range-tracking logic 36 so as to cause the system to "lock on" to certain reflected pulses, as identified by their range, (i.e. the time delay between transmission and reception).

The video output of the receiver 29 is applied to a phase-sensitive detector 37, in which the signal is split into two paths. The first path comprises an amplifier 38 with a gain of +1 and a switch 39, while the second path comprises an amplifier 40 with a gain of −1 and a switch 41, both switches being controlled by the reference signal $V_R$. Specifically when the reference signal is positive, switch 39 is closed, and when it is negative, switch 41 is closed. The signals from the two paths are recombined in a mixes 42, and are averaged in a smoothing circuit 43.

Figure 9:
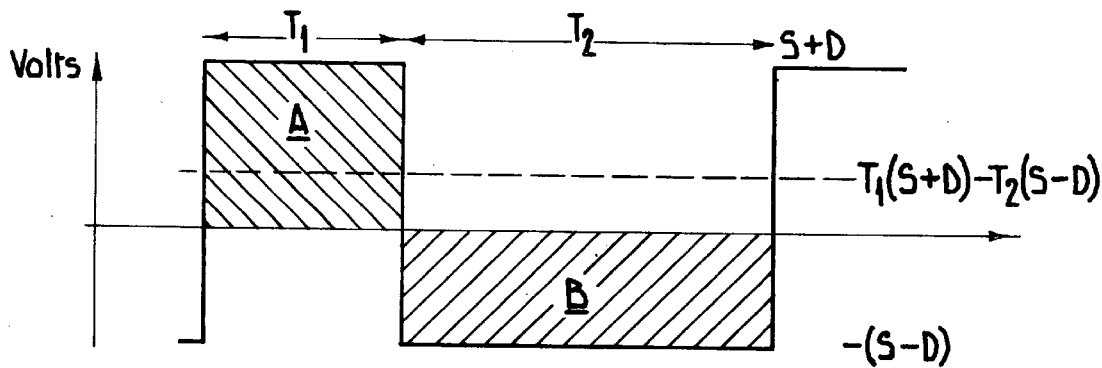

The effect of this is shown in FIG. 9, where the solid line represents the output from the mixer 42, and the broken line represents the output of the smoothing circuit 43. As will be seen, the output from the mixer alternates between the values (S+D) and −(S−D), and the magnitude of the averaged value from the smoothing circuit, 43 is proportional to:

$$T_1(S+D) - T_2(S-D) \qquad (1),$$

that is, is proportional to the depth of modulation of the receiver output weighted by the mark/space ratio. The output from the phase-sensitive detector $V_O$ is applied to an integrator 44 which produces a time integral of $V_O$ over a period substantially longer than the period of the reference signal. The integrated value of $V_O$ is fed to one input of an adder 45, the output $V_C$ of which is used to control the mark/space ratio of the reference signal from the reference generator 28, as will be described.

Thus, a closed loop is set up. The control signal $V_C$ varies the mark/space ratio in such a manner as to favor the lower amplitude part is the signal S±D, (i.e. the part of the signal corresponding to the lobe further from the target) increasing its duration until its longer duration balances the greater amplitude of the other part of the signal. The result of this is that the area A (FIG. 9) is equalized with the area B, and hence the output $V_O$ of the phase sensitive detector tends to zero. In this condition the value of the control signal $V_C$ is a measure of the error angle $\phi_F$ as will be described.

Figure 10:
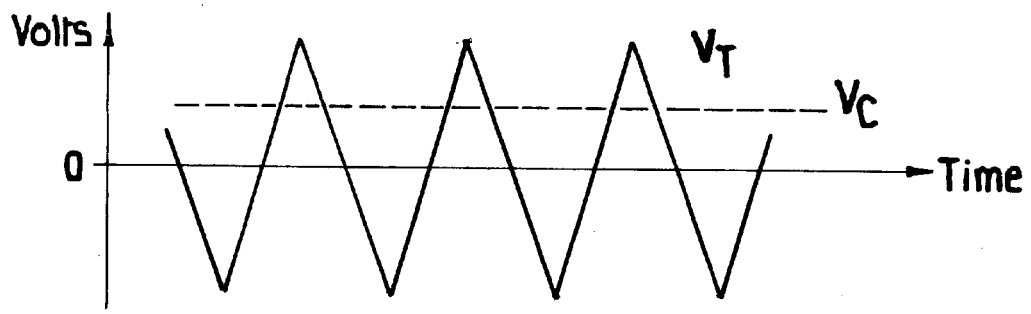
Figure 11:
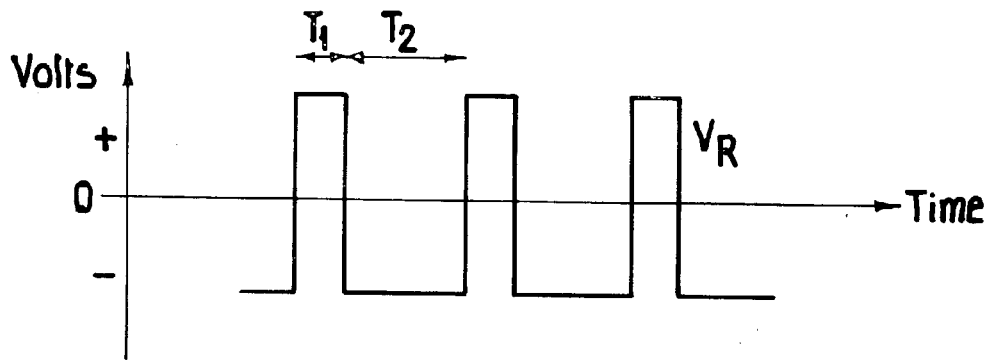

The reference generator 28 comprises a triangular wave generator 46, the output of which is represented in FIG. 10. The instantaneous value of the triangular wave is compared contiguously With the control signal $V_C$, in a comparator 47. When the instantaneous value of the triangular wave exceeds $V_C$, a positive output voltage is produced; when it falls below $V_C$, a negative output voltage is produced. The resulting reference signal produced from the comparator is shown in FIG. 11, from which it will be seen that the mark/space ratio of the reference signal is given by the equation:

$$\frac{T_1}{T_2} = \frac{V_T - V_C}{V_T + V_C} \qquad (2)$$

where $V_T$ is the amplitude of the triangular wave. Thus, the mark/space ratio is 1 if $V_C$ is zero, is greater than 1 if $V_C$ is negative, and less than 1 if $V_C$ is positive.

The reference signal is applied from the comparator 47 to the pause switch 27, by lay of a gate 48, the purpose of which is explained below.

In operation, the system tends to a state in which the output $V_O$ of the phase-sensitive detector 37 is zero, and the output of the integrator 44 is therefore constant. In this state, therefore, expression (1) is equal to zero, that is:

$$\frac{T_1}{T_2} = \frac{S-D}{S+D} \qquad (3)$$

Comparing this with equation (2) shows that, in this state, the control signal $V_C$ is proportional to the ratio D/S, and therefore is proportional the error angle $\phi_E$, assuming that this angle is small.

To summarise, the closed loop formed by the phase switch L7, phase-sensitive detector 37, and reference generator 28 tends to a state wherein the control voltage $V_C$ is proportional to the error angle $\phi_E$. If the target roves relative to the dish axis, the voltage $V_C$ will vary to follow the varying value of the angle $\phi_E$. Thus, the system can be thought of as providing an "electronic axis" which tracks the target, without movement of the antenna One advantage of using this closed-loop system for measuring $\phi_E$ is that the accuracy of the measurement is unaffected by variations in gain or time constant of the receiver 29, being determined only by the quality of the phase switch 27 and the reference generator 28. In addition, because of the wide bandwidth of the feedback loop, the "electronic axis" tracks the moving target very rapidly and accurately, giving wide bandwidth isolation of the measured target sightline from missile body movement.

The voltage $V_C$, representing the error angle $\phi_E$, is applied to the dish servo motor 6, forming a servo loop which tends to move the dish to reduce the error angle to zero, hence causing the dish mechanically to track the target.

Assuming that no further inputs were applied to the aider 45, the output of the integrator 44 would have the value $V_C$, and thus be proportional to $\phi_E$. Hence, the input of the integrator $V_O$ would be proportional to the rate of change $\phi_E$ of the error angle. In the system shown, however, two further correction signals are sub-traced from the integrator output in the adder 45. The first of these correction signals is obtained from the dish pick-off potentiomete 7 and is proportional to $\phi_D$, the angle between the antenna axis 17 and the missile axis, while the second of these correction signals is obtained from a heading gyro 49 in the missile, and is proportional to the angle $\phi_M$ between the missile axis and some fixed reference direction (e.g. true north). The relationship between these angles is shown in FIG. 12.

Figure 12:
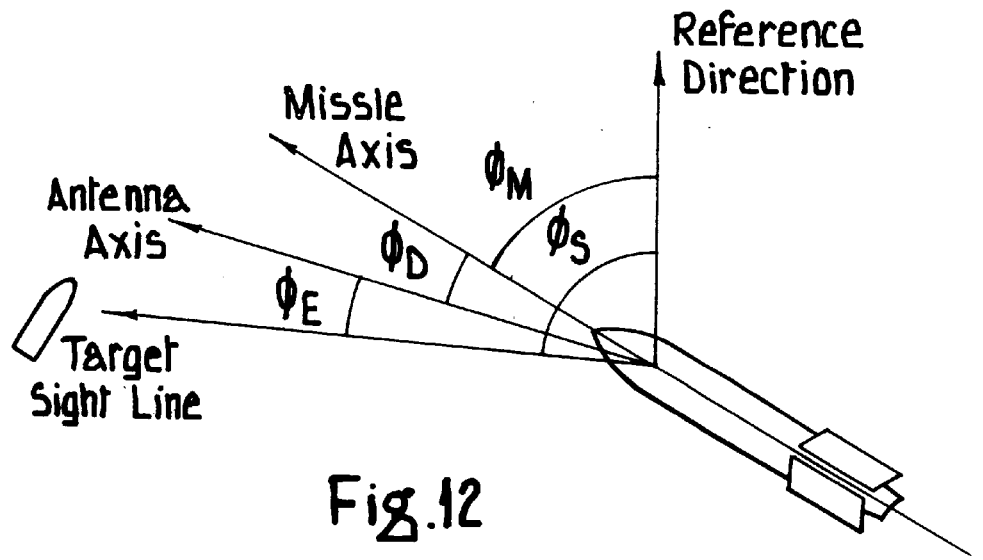

The output of the adder 45 is, as shown above, proportional to $\phi_E$, and the relationship between the angles as shown in FIG. 12 is $\phi_E = \phi_S - \phi_M - \phi_D$. It follows that the output of the integrator 44 is constrained to be equal to $\phi_S$, the angle between the target line of sight end the reference direction. Hence, the input to the integrator 44 must be proportional to the rate of change $\phi_S$ of this angle.

This signal proportional to $\phi_S$ is fed to the autopilot 50 of the missile, and is used to determine the acceleration to be applied to the missile in accordance with the known method of proportional navigation. In this method, the missile course is so adjusted as to make the rate of change of the angle $\phi_S$ tend to zero, the course then being the required collision course.

The function of the gate 48 will now be described. The gate 48 is controlled by a signal from the boxcar circuit 34, and prevents the reference signal $V_R$ from changing value (from positive to negative or vice versa) during the course of a stretched pulse from the boxcar: i.e. it ensures that the transitions of the reference signal occur only at the ends of the stretched pulses.

If the reference signal were allowed to change value in the middle of a stretched pulse, the effect would be that while the reference signal indicated that the signal fed to the receiver was from one of the lobes (18 say), the output of the receiver would remain clamped (due to the operation of the boxcar circuit) at the value appropriate to the other lobe (19). This would result in a false output from the phase-sensitive detector—in effect, a quantisation error due to the pulsed nature of the radio waves—and consequently would reduce the accuracy of the values of $\phi_E$ and $\phi_S$ so obtained.

In another system in accordance with the invention the antenna may have a fixed dish system, and the system may rely solely on tracking of the "electronic axis" to track the target. Such a system would be suitable, for example, in a ground-based radar for tracking aircraft confined to a relatively narrow flightpath. Alternatively, the antenna may be of the fully-steered type, wherein the feed waveguides are tilted along with the dish.

In another for of the invention, the angle between target and dish axis may be measured without the use of a closed loop. For example, the system shown in FIG. 5 may be modified to have a fixed mark/space ratios The phase sensitive detector would then give an output signal which was proportional to the difference signal, this signal thus being a measure of the error angle.

What is claimed is:

1. A guided missile target tracking radar system comprising a source of radar waves; an antenna structure; mounting means to mount the antenna structure on the missile; coupling means to couples said source to said antenna structure to propagate radar waves; said antenna structure being responsive to the return of propagated radar waves by reflection from a target to produce two antenna output signals respectively corresponding to the displacement of said target from an antenna axis; a single channel superheterodyne radar receiver; a reference signal source to supply an alternating reference signal; multiplexer means coupled between said antenna structure and said receiver, and coupled to said reference signal source, to pass said antenna output signals alternately to said receiver in synchronism with said alternating reference signal; said receiver including a range gate which is responsive to said antenna output signals to produce a receiver output signal which represents a target tracking signal; a phase sensitive detector coupled to said receiver and to said reference signal source, and responsive to said receiver output signal and to said reference signal to produce a signal representing the angle between said antenna axis and said target; integrator means coupled to said detector to integrate said signal representing said angle to produce an integral signal; said reference signal source being coupled to said integrator means to receive said integral signal and to produce said reference signal in response thereto; and missile guidance means coupled to said detector and responsive to said signal representing said angle to guide said missile towards said target.

2. A radar system comprising an antenna arrangement having at least two outputs corresponding respectively to two over-lapping main lobes in the antenna reception pattern; means to supply an alternating reference signal; a multiplexer connected to feed signals, produced at the respective antenna outputs when radio waves from a target are received by the antenna, alternately to a single receiver channel in synchronism with said alternating reference signal; an error circuit responsive to the output of the receiver channel and to the reference signal to produce an error signal the magnitude and sign of which are respectively representative of the magnitude and direction of an error angle between the target and a predetermined axis which is fixed relative to said reception pattern and control means coupled to control the mark/ space ratio of the reference signal and hence the ratio of the relative periods spent by the multiplexer in feeding the two antenna outputs respectively to the receiver.

3. A system according to claim 2 wherein the error circuit comprises a phase-sensitive detector coupled to the receiver to produce an output signal the magnitude of which depends on the modulation of the output from the receiver channel weighted by the mark/space ratio of the receiver output., and the sign of which depends on the relative phases of the receiver output and said reference signal; and an integrator coupled to the detector to form a time integral signal dependent on the detector output signal over a period substantially longer than the period of the reference signal, said time integral signal being coupled to means to provide an error signal to control said mark/space ratio in such a manner as to tend to reduce the detector output signal to zero.

4. A system according to claim 2 wherein pulsed radio waves are used, the receiver channel includes a boxcar circuit coupled therein to stretch each pulse to a length approximately equal to the pulse repetition period of the pulsed radio waves, and there is provided gating means coupled to prevent the multiplexer from switching from one antenna output to the other during the course of a stretched pulse.

* * * * *